(12) United States Patent
Wille

(10) Patent No.: US 8,262,329 B2
(45) Date of Patent: Sep. 11, 2012

(54) FASTENING DEVICE

(75) Inventor: Lothar Wille, Moerfelden-Walldorf (DE)

(73) Assignee: Gesipa Blindniettechnik GmbH, Frankfurt a.M.

( * ) Notice: Subject to any disclaimer, the term of this patent is extended or adjusted under 35 U.S.C. 154(b) by 564 days.

(21) Appl. No.: 12/035,937

(22) Filed: Feb. 22, 2008

(65) Prior Publication Data

US 2008/0206011 A1    Aug. 28, 2008

(30) Foreign Application Priority Data

Feb. 26, 2007   (DE) .................. 10 2007 009 616

(51) Int. Cl.
   *F16B 13/06*  (2006.01)
(52) U.S. Cl. ............................ 411/34; 411/49
(58) Field of Classification Search .......... 411/34, 411/36–38, 49, 55, 402, 408
   See application file for complete search history.

(56) References Cited

U.S. PATENT DOCUMENTS

| | | | | |
|---|---|---|---|---|
| 2,018,251 A * | 10/1935 | Croessant | ........................ | 411/37 |
| 2,918,841 A * | 12/1959 | Poupitch | ........................ | 411/36 |
| 3,034,386 A * | 5/1962 | Corlett et al. | ................... | 81/112 |
| 3,304,830 A * | 2/1967 | Shackelford | ................. | 411/500 |
| 3,379,231 A * | 4/1968 | Gallo, Sr. | ........................ | 81/455 |
| 3,606,814 A * | 9/1971 | MacKenzie | ................... | 411/80.2 |
| 4,269,106 A * | 5/1981 | Leibhard et al. | ................. | 411/34 |
| 4,878,791 A * | 11/1989 | Kurihara et al. | ................. | 411/55 |
| 4,966,511 A * | 10/1990 | Lee | ................................. | 411/55 |
| 5,044,849 A * | 9/1991 | Starke | ................................ | 411/38 |
| 5,569,005 A * | 10/1996 | Millington | ........................ | 411/34 |
| 6,592,313 B2 * | 7/2003 | Kohori | ............................... | 411/402 |
| 6,893,196 B2 * | 5/2005 | Wille | ................................. | 411/34 |
| 7,322,783 B2 * | 1/2008 | Pearce et al. | ..................... | 411/29 |
| 2003/0215303 A1 | 11/2003 | Makino | | |
| 2004/0247414 A1 | 12/2004 | Pearce et al. | | |

FOREIGN PATENT DOCUMENTS

| | | |
|---|---|---|
| DE | 9104365 | 8/1992 |
| DE | 91 04 365 | 9/2002 |
| DE | 10126747 | 6/2003 |
| DE | 10253888 | 12/2003 |
| DE | 102 53 888 | 7/2005 |
| EP | 0663537 | 7/1995 |
| EP | 1359330 | 11/2003 |
| JP | 59-127911 | 8/1984 |
| WO | 2006/038801 | 4/2006 |

OTHER PUBLICATIONS

Search report from E.P.O. that issued with respect to patent family member European Patent Application No. 08002324.5, mail date is Mar. 4, 2011.
U.S. Appl. No. 12/035,943, filed Feb. 22, 2008.

* cited by examiner

*Primary Examiner* — Flemming Saether

(74) *Attorney, Agent, or Firm* — Greenblum & Bernstein, P.L.C.

(57) ABSTRACT

Fastening unit and method for fastening components together. The fastening unit includes a blind rivet nut having a set head and a rivet shank, a screw with a screw head and a threaded shank, and a washer held on the blind rivet nut by the screw, and including a torque application surface and a projection projecting over the torque application surface at least in some sections. The instant abstract is neither intended to define the invention disclosed in this specification nor intended to limit the scope of the invention in any way.

14 Claims, 4 Drawing Sheets

FASTENING DEVICE

CROSS-REFERENCE TO RELATED APPLICATIONS

The present application claims priority under 35 U.S.C. §119 of German Patent Application No. 10 2007 009 616.1 filed Feb. 26, 2007, the disclosure of which is expressly incorporated by reference herein in its entirety.

BACKGROUND OF THE INVENTION

1. Field of the Invention

The invention relates to a fastening unit having a blind rivet nut, a washer and a screw with a screw head and a threaded shank. The blind rivet nut has a set head and a rivet shank and the washer is held on the blind rivet nut by the screw.

2. Discussion of Background Information

Fastening units of this type have proven useful, e.g., for fastening functions in which a threaded connection is necessary in thin-walled materials, such as, e.g., metal sheets, into which a thread cannot normally be cut. The fastening unit is thereby fastened in a metal sheet in the manner of a blind rivet. The term metal sheet is used below to represent all thin-walled elements to which, for example, a component is to be fastened.

A fastening unit is known from DE 101 267 47 C2, in which the placement of the fastening unit and the fastening of a component on a metal sheet takes place in one operation. The fastening unit is inserted through the component to be fastened and, at the same time, through an opening of the metal sheet to which the component is to be fastened. The set head is subsequently shaped by rotating the screw of the fastening unit, so that a firm connection is produced. The torque that is introduced into the blind rivet nut of the fastening unit by threading in the screw is transferred to the metal sheet, the opening in the metal sheet being embodied or formed in a polygonal manner and the blind rivet nut has a corresponding cross section for this purpose.

It is often problematic to bring the polygonal cross section of the blind rivet nut into line with the polygonal opening in the metal sheet, above all when the blind rivet nut has already been guided through the component to be fastened. The fastening unit is generally first guided through the component and through the metal sheet, the screw of the fastening unit being tightened in a subsequent operation with the aid of a placing tool.

SUMMARY OF THE INVENTION

The invention provides a fastening unit that renders possible a simplified placement.

According to the invention, a fastening unit of the type mentioned at the outset includes the washer having a torque application surface and a projection, which at least in some sections projects over the torque application surface.

This results in several advantages. A placing tool can engage on the projection of the washer and thus hold the fastening unit securely on the placing tool. Thus, it is possible to guide the fastening unit already connected to the placing tool through the component to be fastened and the metal sheet, without a danger of losing the fastening unit from the placing tool. Since the fastening unit has already been threaded with the aid of the placing tool, the placing and fastening of the fastening unit can take place in one operation, without a wrap around or the like being necessary.

Through the torque application surface of the washer, the washer can be prevented from being rotated as well during the tightening of the screw. This is particularly desirable whenever sensitive components are fastened to a metal sheet, since no relative movement then occurs between the washer and the component.

Preferably, the projection is arranged on the end of the washer pointing away from the blind rivet nut. An easy engagement over the projection by a placing unit is thus possible. At the same time sufficient room is left for the torque application surface. The placing tool element that engages over the projection, for example, can thereby also be brought into engagement with the torque application surface of the washer. It is particularly preferred thereby for the torque application surface to be formed by at least two flat surfaces parallel to one another. An embodiment of this type provides easy possibilities for coupling with the placing tool. This placing tool can have, e.g., a fork-shaped receptacle. The use of a conventional screwdriver, for example, is also conceivable thereby.

Preferably, the torque application surface is embodied as a square, although other polygonal shapes are also contemplated. An embodiment of this type is easy to produce and simplifies a connection to the placing tool due to the symmetry.

Preferably, the washer has a recess in which the screw head is accommodated. The screw head therefore does not project beyond the surface of the washer. This results in a harmonious overall impression. At the same time, this means that the fastening unit projects only slightly over the component to be fastened. Projecting edges, which can possibly pose a risk of injury, are thus avoided.

Preferably, the washer is connected undetachably to the screw. A securing device can be achieved, e.g., by slightly deforming the washer after the screw has been inserted through the washer. Handling is thus simplified. To assemble the fastening unit, only the screw needs to be screwed into the blind rivet nut, as the washer is already located on the screw.

Preferably, the blind rivet nut has a deformable extension on the side of the set head opposite the rivet shank. By tightening the screw, first the closing head is formed in the conventional manner. The fastening unit is thus already sufficiently fastened in the metal sheet. Because the extension is likewise deformable, it is ensured that the component can also be held on the metal sheet with the necessary force when the screw is further rotated, since the spacing of the washer from the metal sheet is reduced through the deformation of the extension. By rotating the screw, a secure fastening of the blind rivet nut in the metal sheet and likewise a secure fastening of the component is thus achieved.

It is particularly preferred for the washer to have a depression on its side facing towards the blind rivet nut. This depression can receive the deformable extension at least in part. The fastening unit can be adjusted to different components through the selection of a washer with a correspondingly deep depression. While the blind rivet nut is conventionally selected depending on the thickness of the component to be fastened, an adjustment can be made through the selection of the washer. An adjustment of the washer can be carried out more easily than a change in the length of the blind rivet nut.

Preferably, the depression has a base inclined inward. During a deformation of the extension, this extension can then slide along the inward-inclined base, which results in a defined deformation.

Preferably, the washer and the blind rivet nut are connected to one another in a torsionally resistant manner. Thus, it is possible to also fasten the fastening unit in openings of the metal sheet that have a round cross section. The torque that is transferred to the blind rivet nut by the rotation of the screw is then absorbed by the washer and from there via the torque application surface by the placing tool. Round holes are not only easier to produce in metal sheets, the placement of the fastening unit is also simplified. The placing operation can thus take place more quickly, so that costs can be saved.

Preferably, the washer has recesses on its side facing towards the blind rivet nut, into which recesses projections of the blind rivet nut can be inserted. A form closure is thus produced between the washer and the blind rivet nut, so that torques from the blind rivet nut can be safely transferred to the washer.

In another preferred exemplary embodiment, the blind rivet nut has at least one section with a polygonal cross section. With the aid of a polygonal cross section of this type the blind rivet nut can be held in a metal sheet in a torsionally resistant manner, so that an easy threading of the screw is possible. A torsionally resistant connection between washer and blind rivet nut is then unnecessary.

Preferably, the screw has a thread-forming thread. This facilitates the production of the fastening unit. The blind rivet nut is simply embodied as an extruded part. An internal thread does not need to be formed before the assembly of the blind rivet nut and the screw. Instead this internal thread is not generated until the screw is threaded into the blind rivet nut. However, the threading is necessary anyway, so that no additional operation is required by this.

The invention is directed to a fastening unit that includes a blind rivet nut having a set head and a rivet shank, a screw with a screw head and a threaded shank, and a washer held on the blind rivet nut by the screw, and including a torque application surface and a projection projecting over the torque application surface at least in some sections.

According to a feature of the invention, the projection may be arranged on an end of the washer pointing away from the blind rivet nut.

In accordance with another feature of the instant invention, the torque application surface may be formed by at least two flat surfaces parallel to one another. Further, the torque application surface can formed as a square.

According to still another feature of the present invention, the washer may have a recess structured to accommodate the screw head.

According to another feature, the washer is connected undetachably to the screw.

In accordance with still another feature of the present invention, the blind rivet nut may include a deformable extension on a side of the set head opposite the rivet shank.

Further, the washer can include a depression on its side facing towards the blind rivet nut. Moreover, the depression can have a base inclined inward.

According to a further feature of the invention, the washer and the blind rivet nut may be connected to one another in a torsionally resistant manner.

In accordance with another feature of the instant invention, the washer can have recesses on its side facing towards the blind rivet nut, and projections of the blind rivet nut may be insertable into the recesses.

According to still another feature, the blind rivet nut can have at least one section with a polygonal cross section.

In accordance with the invention, the screw can include a thread-forming thread.

According to still another feature, the blind rivet nut may include projections on the set end insertable into recesses formed in the washer.

The invention is directed to a method for fastening components together. The method includes holding a washer in place adjacent a first component, screwing a screw through the washer and into a blind rivet nut that is prevented from rotating, deforming a deformable surface of a rivet shank to securely hold the second component, and pressing the washer onto the first component.

According to a feature of the present invention, the holding may include gripping torque application surfaces of the washer with a placing tool.

In accordance with another feature of the invention, the blind rivet nut can be prevented from rotating by positioning the rivet shank, having a polygonal cross-section, into corresponding polygonal bore in the components.

Further, the blind rivet nut may be prevented from rotating by engaging projections on the blind rivet nut with recesses in the washer.

According to another feature of the instant invention, prior to screwing, the washer can be held to form an air gap between the washer and the first component.

In accordance with still yet another feature of the present invention, the method can include forming threads on the screw as it is screwed into the blind rivet nut.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
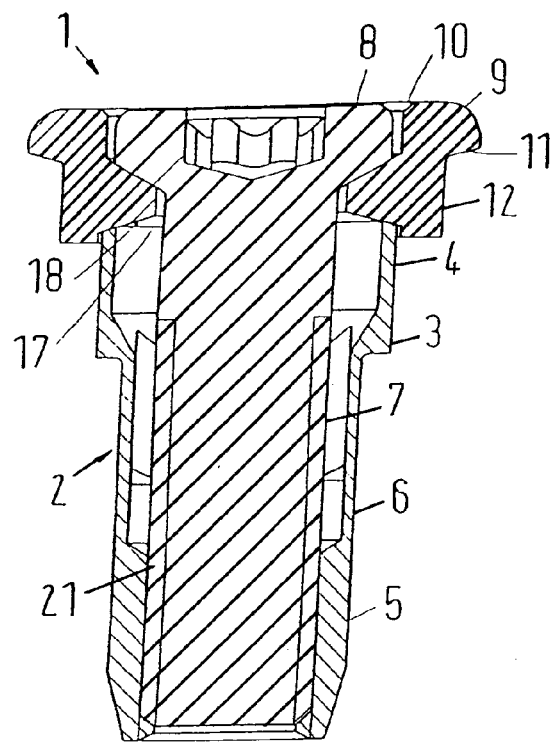
FIG. 1 diagrammatically illustrates the fastening unit of the invention in sectional view.

FIG. 1 shows in diagrammatic representation a fastening unit 1 with a blind rivet nut 2, which has a set head 3 with a deformable extension 4 and a rivet shank 5. Rivet shank 5 has a deformable area 6 for forming a closing head. A screw 7 is screwed into blind rivet nut 2, which screw has a screw head 8 and a threaded shank with a thread 21. A washer 9 is arranged between screw head 8 and deformable extension 4 of blind rivet nut 2.

Thread 21 is embodied as a thread-forming thread. This has the advantage that blind rivet nut 2 can be produced as an extruded part, without already having to embody an internal thread. Thus this saves one operation in the production of blind rivet nut 2. The internal thread is then formed by thread 21 while screwing in screw 7. However, screwing screw 7 into blind rivet nut 2 is necessary anyway to produce fastening unit 1.

Washer 9 has a recess 10 into which screw head 8 can be received. Furthermore, washer 9 is provided with a projection 11. On the sides of washer 9, torque application surfaces 12 are arranged, over which projection 11 projects in some sections. To place fastening unit 1, a corresponding placing tool can engage around projection 11 of washer 9, thus holding fastening unit 1 securely on the placing tool. With the aid of torque application surfaces 12, it is possible to prevent washer 9 from rotating as well during tightening of screw 7. A deformation of deformable area 6 of rivet shank 5 occurs by tightening screw 7, so that a closing head is formed and thus fastening unit 1 is held securely, e.g., in a metal sheet (not shown). Subsequently, or at the same time, a deformation of deformable extension 4 of blind rivet nut 2 takes place, while washer 9 is pressed in the direction of the metal sheet (not shown). It is thus ensured that a component to be fastened is pressed by washer 9 against the metal sheet to which it is to be attached.

Figure 2:
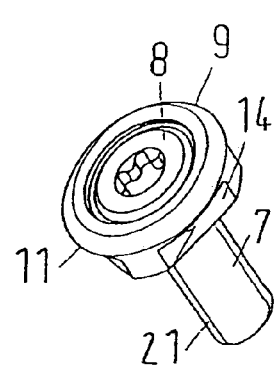
FIG. 2 illustrates a three-dimensional representation of a partially sectional view of the fastening unit of the invention.

FIG. 2 shows fastening unit 1 according to FIG. 1 in partially sectional, three-dimensional representation. In addition, blind rivet nut 2 has a polygonal cross section in the area of rivet shank 5, which is inserted into a metal sheet (not shown). To this end, the metal sheet has an opening corresponding to the polygonal cross section of blind rivet nut 2. The torque introduced via screw 7 while threading screw 7 can thus be absorbed by the metal sheet. Torque application surface 12 is embodied or formed as a square 14. Screw 7 is embodied or formed as a Torx screw with a corresponding receptacle in screw head 8. However, other embodiments of screw 7 are also conceivable.

Figure 3:
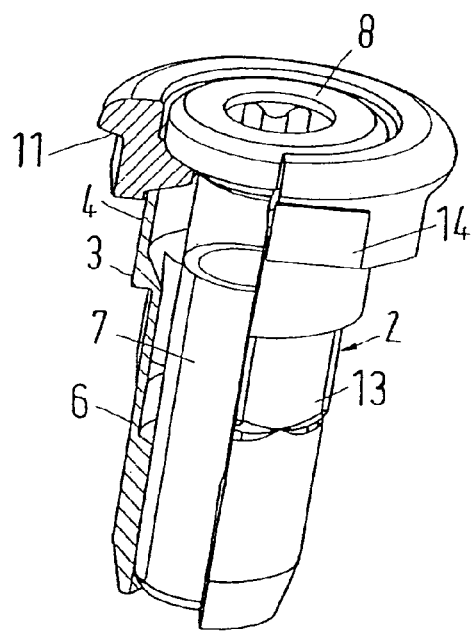
FIG. 3 illustrates a three-dimensional representation of a screw with washer.

FIG. 3 shows screw 7 with washer 9 connected thereto. Torque application surface 12 of washer 9 is embodied or formed as a square 14. The corners of square 14 are rounded, wherein projection 11 does not project in the area of the rounded corners. A projection in the area of the flat surfaces of square 14 is sufficient in order to be able to hold fastening unit 1 securely in a placing tool. While the exemplary embodiment is directed to a square, it is understood that the invention contemplates the use of other polygonal shapes without departing from the spirit and scope of the invention.

Figure 4:
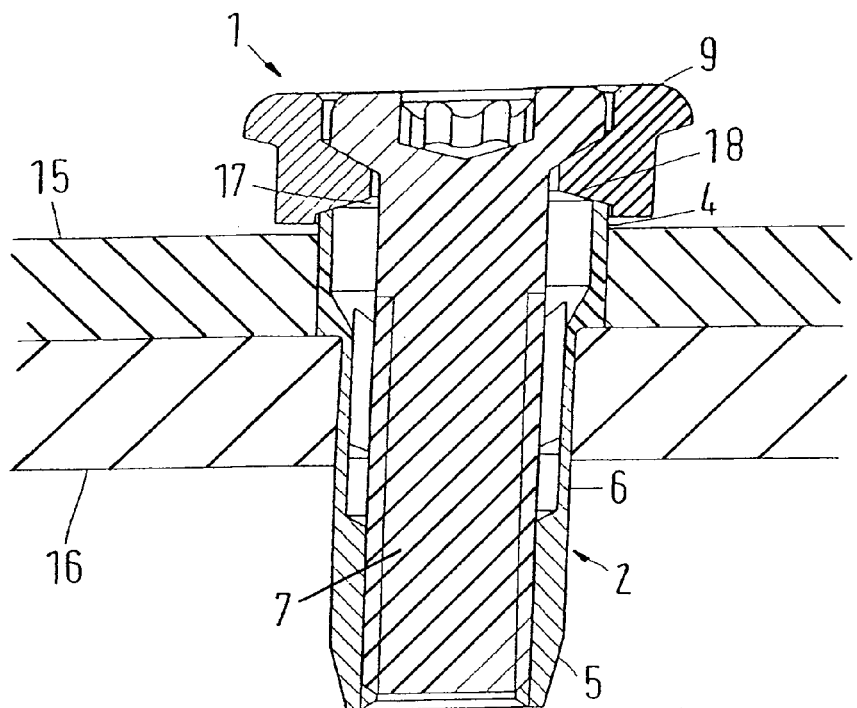
FIG. 4 illustrates a sectional representation of the fastening unit that has already been guided through a component and a metal sheet.

FIG. 4 shows a placed fastening unit 1 before its deformation. Fastening unit 1 is guided through a component 15 to be fastened and through a metal sheet 16 to which component 15 is to be fastened. As screw 7 has not yet been tightened, no deformation of deformable area 6 of rivet shank 5 to form the closing head and no deformation either of deformable extension 4 on set head 3 of blind rivet nut 2 has occurred. An air gap is located between component 15 and washer 9. If a deformation of deformable region 6 now first occurs to form the closing head, no force is exerted on component 15. A deformation of the extension 4 does not occur until the closing head is embodied or formed, through which the air gap between washer 9 and component 15 is closed. Component 15 is pressed by washer 9 against metal sheet 16 so that small deviations in the thickness of component 15 are equalized.

A later deformation of deformable extension 4 is achieved, e.g., by extension 4 having a larger wall thickness than deformable area 6. In order to achieve a defined deformation of extension 4, screw 9 has a depression 17 with a base 18 inclined inward. By the threading of screw 7, extension 4 then slides along base 18 inclined inward, that is, in the direction of the screw axis.

Figure 5:
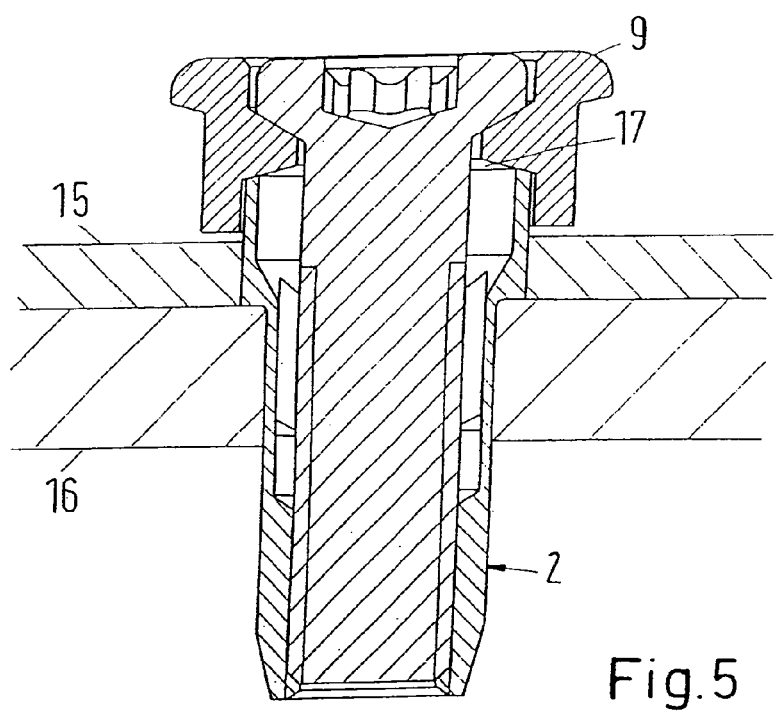
FIG. 5 illustrates an arrangement similar to that depicted in FIG. 4 but with a thinner component.

Fastening unit 1 can be adapted to different component thicknesses through the selection of a washer 9 with a corresponding depression 17. This is made clear by a comparison between FIG. 4 and FIG. 5. In FIG. 5 a component 15 is fastened to metal sheet 16 that has a smaller thickness than component 15 in FIG. 4. Accordingly, depression 17 in washer 9 is embodied to be deeper so that a larger section of blind rivet nut 2 is received in depression 17 of washer 9. It is therefore not necessary to change blind rivet nut 2 to adjust to different thicknesses of component 15. The same placing tool can also be used.

Figure 6:
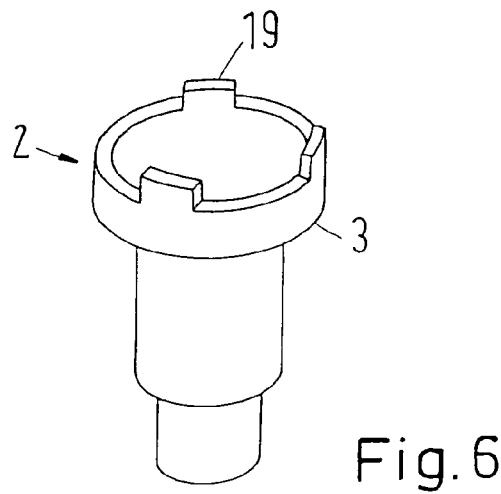
FIGS. 6-8 illustrate various embodiments of the blind rivet nut.

FIG. 6 shows diagrammatically a blind rivet nut 2, which has projections 19 on set head 3, which can be brought into engagement with corresponding recesses in washer 9. Blind rivet nut 2 can thus be prevented from also rotating when blind rivet nut 2 does not have a polygonal cross section 13 in the area of metal sheet 16, so that the torques introduced via screw 7 are not absorbed via metal sheet 16.

Figure 7:
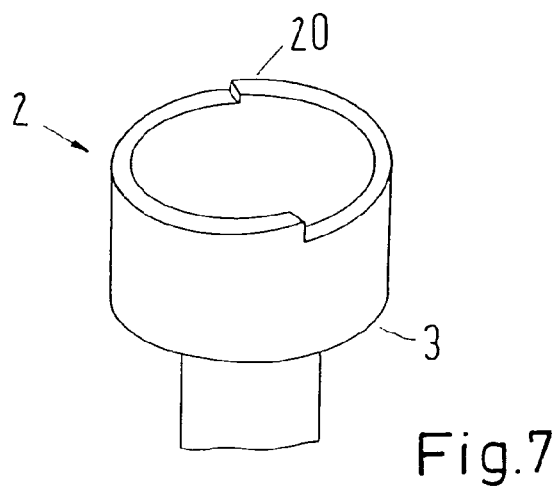
Figure 9:
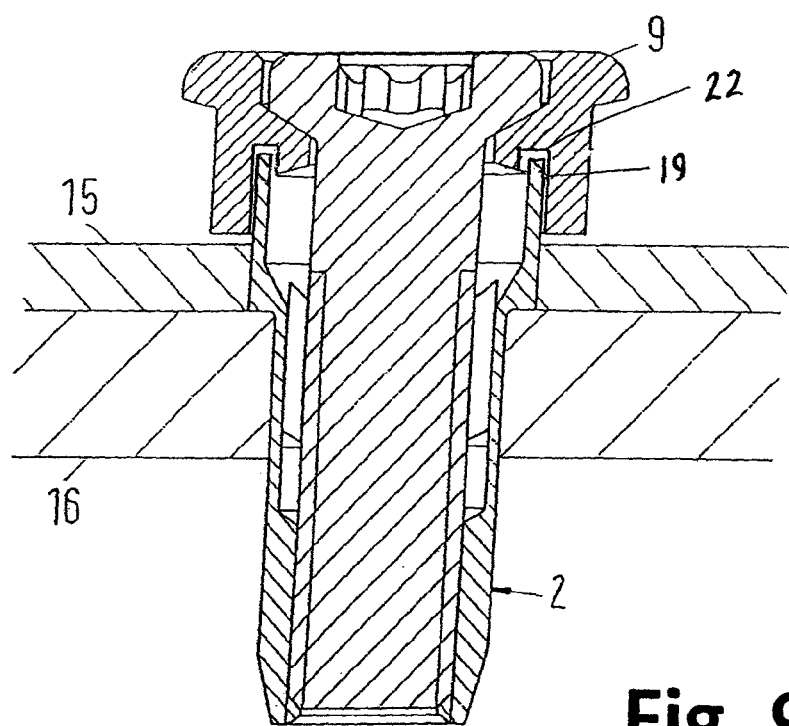
FIG. 9 illustrates the combination of the nut projections and the washer depressions.

FIG. 7 shows projections 19 as lugs 20 that are directed against the direction of rotation of blind rivet nut 2. The washer 9 then has corresponding depressions 22 (as shown in FIG. 9).

Figure 8:
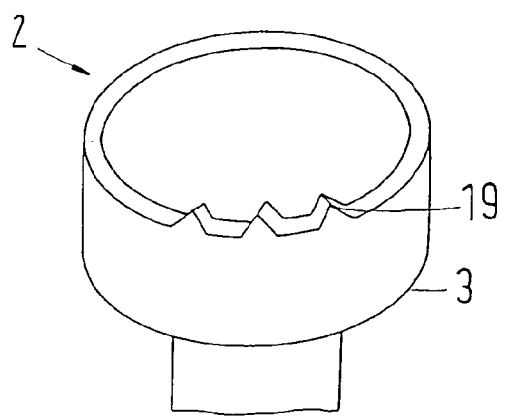

In FIG. 8 projections 19 of blind rivet nut 2 are embodied as a fine keying that can extend over the entire circumference. It is also hereby desirable, but not absolutely essential, for washer 9 to have corresponding recesses.

The advantage in an embodiment of blind rivet nut 2, as shown by way of example in FIGS. 6 through 8, is that fastening unit 1 can also be fastened in round openings in the metal sheet. At the same time, a polygonal cross section 13 on blind rivet nut 2 can be omitted. During placement, polygonal cross section 13 of blind rivet nut 2 therefore does not need to be brought into congruence with the correspondingly formed opening in metal sheet 16. The angular position of fastening unit 1 is therefore of no importance in placement. A quicker placing of fastening unit 1 is thus possible.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:
1. A fastening unit comprising:
a blind rivet nut having a set head and a rivet shank;

said set head being sized and configured to abut against a surface of a component having an opening that receives therein the rivet shank;
a screw with a screw head and a threaded shank; and
a washer being:
  held on the blind rivet nut by the screw; and
  axially retained between the screw head and the set head;
said washer comprising a torque application surface and a projection projecting over the torque application surface at least in some sections,
wherein the torque application surface and the projection are structured and arranged to interact with a tool to prevent said washer from rotating when the screw is rotated, and wherein said washer has a recess on its side facing towards the blind rivet nut, and a projection of the blind rivet nut is insertable into the recess.

2. The fastening unit in accordance with claim 1, wherein the projection is arranged on an end of the washer pointing away from the blind rivet nut.

3. The fastening unit in accordance with claim 1, wherein the torque application surface is formed by at least two flat surfaces parallel to one another.

4. The fastening unit in accordance with claim 1, wherein the washer has a recess structured to accommodate the screw head.

5. The fastening unit in accordance with claim 1, wherein the washer is connected undetachably to the screw.

6. The fastening unit in accordance with claim 1, wherein the blind rivet nut comprises a deformable extension on a side of the set head opposite the rivet shank.

7. The fastening unit in accordance with claim 1, wherein the washer comprises a depression on its side facing towards the blind rivet nut.

8. The fastening unit in accordance with claim 1, wherein the washer and the blind rivet nut are connected to one another in a torsionally resistant manner.

9. The fastening unit in accordance with claim 1, wherein the blind rivet nut has at least one section with a polygonal cross section.

10. The fastening unit in accordance with claim 1, wherein the screw comprises a thread-forming thread.

11. A method for fastening together components with the fastening unit in accordance with claim 1, comprising:
  holding the washer in place adjacent a first component;
  screwing the screw through the washer and into the blind rivet nut that is prevented from rotating;
  deforming a deformable surface of a rivet shank to securely hold a second component;
  pressing the washer onto the first component.

12. A fastening unit comprising:
a blind rivet nut having a set head and a rivet shank;
a screw with a screw head and a threaded shank;
a washer being held on the blind rivet nut by the screw, and comprising a torque application surface and a projection projecting over the torque application surface at least in some sections; and
said torque application surface comprising at least two flat surfaces parallel to one another,
wherein the torque application surface is formed as a square,
wherein the torque application surface and the projection are structured and arranged to interact with a tool to prevent the washer from rotating when the screw is rotated, and wherein said washer has a recess on its side facing towards the blind rivet nut, and a projection of the blind rivet nut is insertable into the recess.

13. A fastening unit comprising:
a blind rivet nut having a set head and a rivet shank;
a screw with a screw head and a threaded shank;
a washer being held on the blind rivet nut by the screw, and comprising a torque application surface and a projection projecting over the torque application surface at least in some sections; and
said washer comprising a depression on its side facing towards the blind rivet nut,
wherein the depression has a base inclined inward,
wherein the torque application surface and the projection are structured and arranged to interact with a tool to prevent said washer from rotating when the screw is rotated, and wherein said washer has a recess on its side facing towards the blind rivet nut, and a projection of the blind rivet nut is insertable into the recess.

14. A fastening unit comprising:
a blind rivet nut having a set head and a rivet shank;
a screw with a screw head and a threaded shank; and
a washer being held on the blind rivet nut by the screw, and comprising a torque application surface and a projection projecting over the torque application surface at least in some sections,
wherein the blind rivet nut comprises projections insertable into recesses formed in the washer on its side facing towards the blind rivet nut,
wherein the torque application surface and the projection are structured and arranged to interact with a tool to prevent the washer from rotating when the screw is rotated.

* * * * *